July 15, 1969    T. O. HOCKENBERRY ET AL    3,456,087
POWER SUPPLY AND AUTOMATIC CONTROL SYSTEM FOR
HIGH-SPEED ELECTRIC DISCHARGE
MACHINING APPARATUS
Filed Aug. 10, 1965    2 Sheets-Sheet 1

INVENTORS
Terry O. Hockenberry &
Everard M. Williams their attorneys

INVENTORS
Terry O. Hockenberry &
Everard M. Williams

United States Patent Office 3,456,087
Patented July 15, 1969

3,456,087
POWER SUPPLY AND AUTOMATIC CONTROL SYSTEM FOR HIGH-SPEED ELECTRIC DISCHARGE MACHINING APPARATUS
Terry O. Hockenberry, Pittsburgh, and Everard M. Williams, Edgewood, Pa., assignors to Siltronics, Inc., Pitcairn, Pa., a corporation of Pennsylvania
Filed Aug. 10, 1965, Ser. No. 478,563
Int. Cl. B23k 9/16
U.S. Cl. 219—69                      8 Claims

ABSTRACT OF THE DISCLOSURE

Electric discharge machining apparatus having energy storing structure including a capacitor. An electrode tool is connected to one terminal of the capacitor and a workpiece is connected to the other terminal thereof. The electrode is mounted for gap controlled movement toward and away from the workpiece. When charged the capacitor discharges through a dielectric fluid in the gap. The capacitor is charged by a rectifying circuit powered by a transformer having a core including a flux leakage leg. The electrode positioning mechanism is controlled by a control winding on the leakage leg.

---

The present invention relates to systems for energizing and controlling the electrode tool of electric discharge or spark machining (EDM) apparatus for cutting extremely hard materials such as the metal carbides, hardened steels and certain alloys of titanium, zirconium, and vanadium, by the repetitive spark cutting method.

In EDM operations, it has been found that crater depth depends upon the magnitude of discharge current while crater area is very nearly proportional to the discharge duration. The material removed by sparks of varying amplitude and fixed duration is roughly proportional to the three halves power of capacitor discharge current. Measurements show that gap width (corresponding to voltage with which the capacitor is charged at the instant discharge takes place) has little effect on crater depth and area, but is significant in that the crater location with respect to electrode positioning becomes increasingly erratic as gap width is increased. Proper control of operating voltage, therefore, has an important effect on machining accuracy for this reason, in addition to its effect on the variations in the critical gap previously noted.

The spark machining or EDM process in which the erosion is greatest at the positive electrode, is evidently quite different from arc-cutting systems in which the greater erosion takes place at the negative electrode. Arc erosion is accompanied by high temperatures and melting, whereas in the spark erosion process microscopic examination of the workpiece surface often gives evidence of fracture by mechanical forces. Spark machined surfaces frequently exhibit no alteration in temperature related properties such as surface hardness. Crystallographic studies of spark machined surfaces of material with transformation temperatures slightly above ambient have shown that machined surface temperature rises are insufficient to produce such crystal transformations. Therefore, in many cases material is removed from the workpiece with little or no melting.

Ideally, the spark machining process is conducted with as high a discharge recurrence rate as is feasible without developing sustained arcing. The closest approach to this ideal condition is obtained by the invention by the provision of a power supply for the capacitor which ensures eveness of charging thereof and minimizes the possibilities of sustained arc discharge. In addition, the electrode tool is carefully advanced by the automatic advance control system of the invention. By controlling the advance rate of the tool with the regulatory characteristic of the power supply, the position of the electrode tool can be precisely placed with respect to the critical confines of the gap width.

The rapidity with which a spark machining process proceeds is dependant also upon properly spacing the recurrent discharges or sparkovers and also upon the use of charging waveforms having as steep a wave front as feasible with the slope of the wave fronts being initially and ideally at zero. This latter ideal condition is closely approached by the invention by provision of a power supply for the capacitor which causes the capacitor to discharge at more nearly regular intervals and to recharge quickly to produce the necessarily rapid voltage rise of very small initial slope. The automatic tool advance portion of the control circuit of the invention cooperates in this objective by nulifying as far as possible the effects of residual debris between the tool and the workpiece.

The invention greatly simplifies the design of electrode drive mechanism which thus is adaptable for operation over a wide range of machining speeds and finishes and with a wide variety of tool sizes and configurations; more particularly the automatic advance control of the invention eliminates difficulty which might be caused, for example, by improper adjustment of prior balance type controls by an operator.

Previous power supplies for EDM apparatus fall into one of the following categories:

In the simplest and earliest arrangement, a relaxation type power supply was utilized which included a D.C. source and a capacitance in parallel with the electric tool and the workpiece, and a resistance in series therewith. The frequency of the recurrent discharges depends upon the values of the resistance and capacitance, and the sparkover characteristics of the gap between the workpiece and tool. The smaller the resistance, the more frequent the discharges, and the greater the removal rate of the material from the workpiece. However, if the resistance is made too small, a long-duration sustained or continuous arc can form between the tool and the work, which destroys the accuracy of the process and damages both the electrode tool and the workpiece. The tendency of this form of power supply to produce sustained arcing is aggravated by a rapid rate of rise of gap voltage immediately following the capacitor discharges. However, as noted previously an overall steep voltage curve is necessary during the charging interval for optimum speed of material removal from the workpiece. In practice, moreover, debris from the electrode tool and the workpiece collects in the gap and the behavior of this form of power supply is still more erratic for this reason.

Independently timed power supplies have been used wherein a uniform discharge recurrence rate is maintained by separate keying apparatus either for capacitor discharges or for direct supply of discharge energy. Unfortunately, independently timed power units can be very expensive, particularly when a wide variety of machining conditions are encountered which can range from low recurrence-rate, very high energy discharges for rapid machining, to very high recurrence rate, low energy discharges for fine finishing and high accuracies.

An attempt has been made to improve the relaxation type power supply with the insertion of an inductor in series with a resistor and capacitor and energized from a D.C. source. Ideally, this would permit a higher discharge recurrence rate, by permitting a lower required value of resistance to be used, without causing serious sustained arcing. This would be achieved because the inductor limits the rate of change in current in the charging circuit, and theoretically, the capacitor should be fully charged for each spark over with an inductor current of zero at the instance the rise of capacitor voltage commences. In practice, however, the incidence of transient short circuits in the gap is appreciable so that the inductor is always carrying some current at the instant the gap is ready to recover. The result is an approximately constant current charge in the capacitor, with the current obtaining a level in dependence upon the duration of the preceding gap short and the extent to which the capacitor has charged before sparkover occurs. Thus, much of the advantage of the inductor is lost since sparkover takes place before the capacitor is fully charged and since a certain amount of gap short circuiting, as by the presence of debris, is inevitable.

The foregoing and other objects, features and advantages of the invention will be elaborated upon during the forthcoming description of illustrative embodiments thereof, when taken in conjunction with the accompanying drawings wherein.

Figure 1:
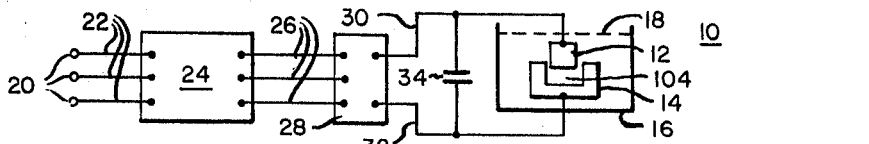
FIGURE 1 is a block diagram of one form of power supply circuit arranged in accordance with the invention.
Figure 2:
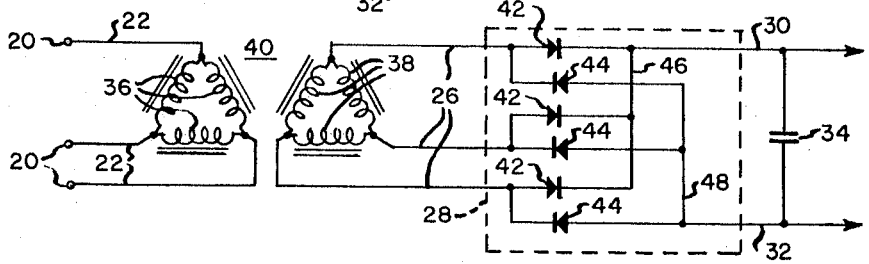
FIGURE 2 is a schematic circuit diagram of portions of the power supply circuit illustrated in FIGURE 1.

Referring now to FIGURES 1 and 2 of the drawings, an illustrative form of power supply for use with spark machining apparatus designated generally by the reference character 10 is illustrated therein. The spark machining apparatus 10 which is shown schematically in FIGURE 1 of the drawings includes an electrode tool 12 having a desired configuration formed on the lower end thereof and a workpiece 14. The tool and the workpiece 12–14 are immersed in a tank 16 containing a dielectric liquid 18, which for example, can be kerosene.

In the following example of the invention, the power supply thereof is described in a polyphase arrangement which enhances the regulatory and control characteristics thereof. It is to be understood, however, that the power supply can be arranged in an obvious manner for single phase operation and used to advantage in this fashion.

The power supply for the spark machining apparatus 10, in this arrangement, is arranged for connection to a source of polyphase potential (not shown) by means of terminals 20. When so connected, such potential is applied through conductors 22 to a polyphase transformer bank of unique structure, but designated generally in FIGURE 1 by reference character 24. Secondary output of the transformer bank 24 is fed through conductors 26 to a conventional polyphase rectifier bank 28. The potential output of the rectifier bank 28 in turn is applied to the electrode tool 12 and the workpiece 14 of the spark machining apparatus through conductors 30 and 32 respectively. A recurrently chargeable-dischargeable capacitor 34 is connected across the conductors 30–32 in the electrical parallel with the tool and workpiece 12–14, to form a discharge path therefor through the tool workpiece and a charging path through the rectifier bank and transformer secondaries.

As shown better in FIGURE 2 of the drawings, both groups of primary windings 36 and of secondary windings 38 of the transformer bank 24 are connected respectively in delta relation for purposes of illustration. It has been found, however, that either Y—Y, delta-Y, or Y-delta network, can be utilized in this arrangement.

From the conductors 26, the secondary output of the delta arrangement 40 is fed to respective pairs of forward and reverse rectifiers 42 and 44 respectively of the rectifier bank 28. The operation of this form of rectifier bank is well-understood and will not be further elaborated upon save to mention that the respective outputs of the rectifiers 42 and 44 are collected through conductors 46 and 48 which in turn are connected to the aforementioned conductors 30 and 32 respectively, whereby the rectified voltage is applied to both the condenser 34 and the tool and workpiece of the spark machining apparatus 10.

Figure 3:
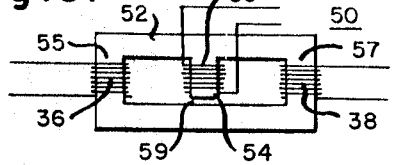
FIGURE 3 is a semi-pictorial view of one form of transformer means which can be utilized with the invention.

In accordance with the invention, to provide the current-loading characteristics, a specialized form of transformer is employed, which is illustrated in FIGURE 3 of the drawings. A transformer 50 shown schematically therein includes a laminated core structure 52 upon which are wound on each of the aforementioned primary and secondary windings 36 and 38. Spaced intermediately between the primary and secondary portions of the transformer core 52 is a leakage leg 54 which desirably is formed integrally with the remainder of the transformer core structure 52.

It is not necessary to the operation of the power supply that the leakage leg be disposed between the primary and secondary winding legs 55 and 57 respectively, but may be extended outwardly of either of the legs 55 and 57 in a known manner (not shown).

Figure 4:
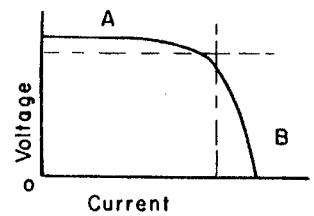
FIGURE 4 is a graphical representation of the voltage-current characteristics of the transformer arrangement of FIGURE 3.

The leakage leg 54, independently of a control winding 56 placed thereon and described below in greater detail, imparts a regulatory characteristic or balancing function to the transformer as evident from its typical current-voltage curve in FIGURE 4 of the drawings. In FIGURE 4 the reference characters A and B designate constant voltage and constant current regions of the transformer voltage-current characteristic.

The voltage curve of FIGURE 4 also denotes the voltage drop which charges the capacitor 34 after each discharge. This follows from the fact that the leakage leg 54 in effect serves as a flux shunt so that when a load is applied to the secondary winding 38, the flux is forced into the lower impedance path across the air gap 59. As a result the secondary voltage drops very nearly to zero, when the capacitor 34 begins to charge and thereafter rises as the magnetic reluctance decreases. Accordingly, the ohmic resistance of the conventional D.C. relaxation power supply is not needed, and in this example, the transformers are to be designed to minimize ohmic losses, which thus serve no useful purpose in the relaxation type power supply of the invention.

Figure 5:
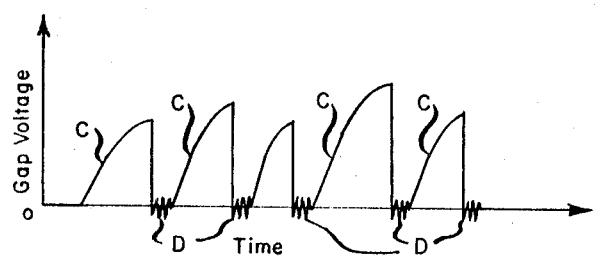
FIGURE 5 is a graphical representation of the voltage-time characteristic of a recurrent discharge or sparkover output of the power supply circuit of the invention.

In this example of the invention, it is contemplated that the transformer bank 24 (FIGURE 1) shall include three of the transformers 50 whose primary and secondary windings 36 and 38 can be electrically interconnected in one of the polyphase arrangements noted above. The summation of the individual blasting or regulatory characteristics of the transformers 50 comprising the transformer bank 24 operates to, according to the present understanding of the invention, uniformly steepen the voltage rise characteristic of each capacitor charge cycle and to minimize or to eliminate altogether the presence of sustained arcing between individual discharges. The initial slope of the voltage curve of each charge across the spark gap 104 is very nearly the same regardless of sparkover voltage or the presence of debris in the gap. As pointed out above, the initial slope of the voltage rise curve initially is very low to promote the most rapid spark machining. The uniform spacing of the recurrent discharges is evident from an inspection of the gap voltage-time graph of FIGURE 5 wherein the reference letter C denotes the uniform slopes of the gap charge curves irrespective of voltage amplitude. The reference letter D denotes the comparative absence of sustained arcing between the individual discharges. Consequently, higher recurrent discharge rates are possible with the power supply circuit of the invention, which, therefore, permits a higher machining speed than that possible with conventional power supply circuits for spark-machining apparatus.

Figure 8:
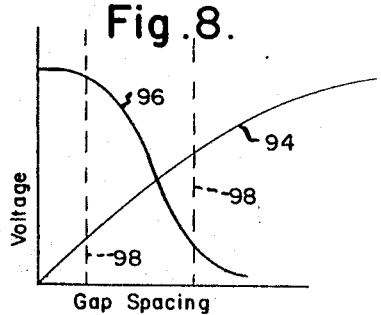
FIGURE 8 is a graphical representation of the output control voltage of the control circuit of FIGURE 6 together with a typical output voltage attained from prior control circuits.
Figure 9:
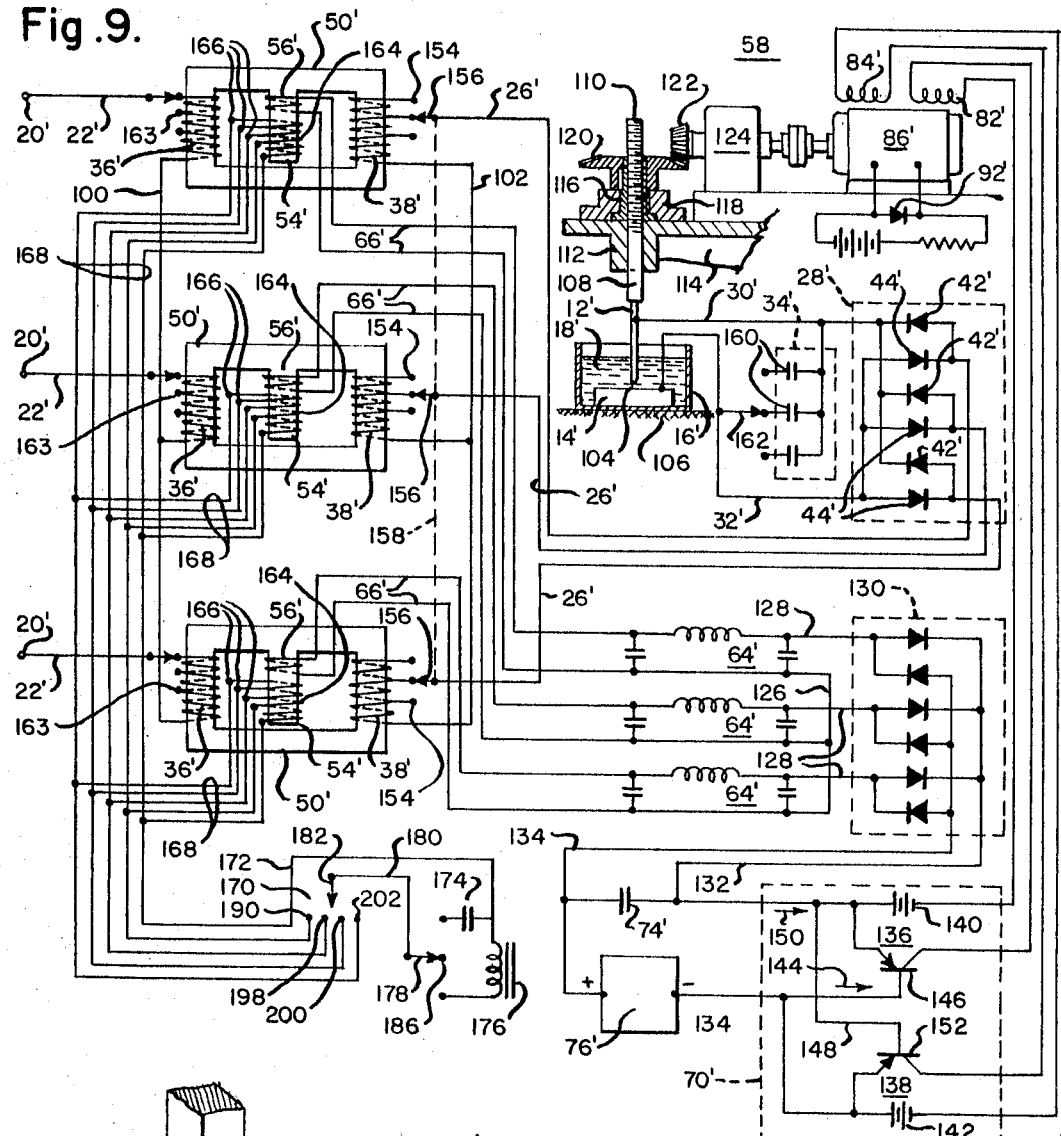
FIGURE 9 is a complete schematic circuit diagram of a cooperatively regulated power supply and automatic advance control circuit arranged in accordance with the invention.

The leakage transformer 50 can be utilized for an additional function with reference to an automatic control system for the electrode tool drive apparatus illustrated semi-pictorially in FIGURE 9 of the drawings and designated by reference character 58. In the past, the drive apparatus 58 has been operated by comparing a standard voltage with the sparkover voltage of the machining gap, as indicated either by the average gap voltage or by the voltage drop across the charging resistor, to produce the corresponding forward or reverse movements of the drive apparatus and attendant decrease and increase of spark gap width. However, such arrangements do not produce a sufficiently high degree of control over gap width to permit the continuous attainment of optimum sparkover conditions. The extent of this deficiency will be elaborated upon below with reference to FIGURE 8 of the drawings.

Figure 6:
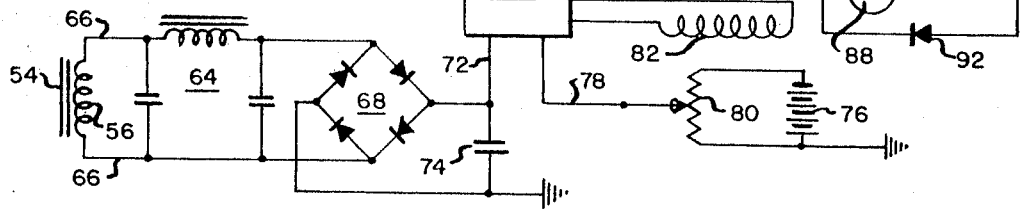
FIGURE 6 is a schematic representation of one form of automatic electrode tool advance circuit of the invention.
Figure 7:
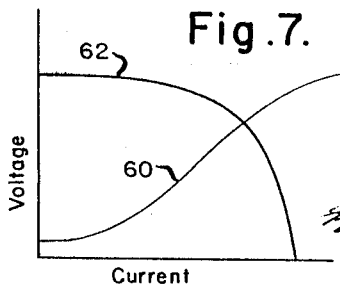
FIGURE 7 is a graphical comparison of voltage-current characteristics of the power output and control signal output of the transformer of FIGURE 3, when provided with a gap control winding in accordance with another feature of the invention.

With reference now to FIGURE 6 of the drawings, an exemplary form of the automatic control circuit of the invention for use with the drive apparatus 58 is illustrated. In this form of the invention, the circuit utilizes an auxiliary secondary winding 56 wound upon at least one of the leakage legs 54 of the transformer bank 24. The auxiliary secondary voltage, as denoted by voltage-current curve 60 of the graph of FIGURE 7 is generally opposite to the principal secondary voltage curve 62. The secondary output of the winding 56 is fed through a low-pass filter of conventional design and denoted generally by reference character 64. The purpose of a filter 64 is to eliminate high-frequency components which are coupled by the transformer 50 from the high frequency components in the oscillatory discharges of the capacitor through the spark machining gap 104 (FIGURE 9). The conductors 66 then apply the auxiliary secondary output or control signal to a conventional rectifier bank 68 whose output in turn is applied to a voltage amplifier 70 through conductor 72. A smoothing capacitor 74 is connected across the output terminals to the rectifier bank 68.

The output of a standard DC voltage source, denoted in FIGURE 6 by battery 76 is also applied to the amplifier 70 in electrical bucking relation to the control signal through conductor 78. The output voltage of the standard source 78 is made adjustable through the use of a variable resistor 80 to meet the varying operating conditions of the spark machining apparatus. It may be noted at this point that where DC sources are represented in the drawings by batteries, these sources may be derived from rectified line voltage which are suitably filtered.

The output of the amplifier 70 is fed to dual field windings 82 and 84 of a reversible drive motor 86 forming part of the drive apparatus 58. The armature 88 of the drive motor 86 is independently energized from a suitable DC source 90. A rectifier 92 is coupled across the armature terminals in electrical parallel with the source 90 which rectifier greatly accelerates motor reversals and is particularly useful when a sudden reversal is needed as when a short circuit occurs at the spark gap. This also eliminates the possibility of driving the tool into the workpiece and resulting in tool and workpiece damage. In this arrangement, the drive motor 86 is driven in the forward direction to decrease the gap width when the control signal is below the reference or standard voltage and in this instance the amplifier 70 supplies operating potential to the forward motor field winding 84. On the other hand, the reverse field winding 82 is energized by the amplifier 70 when the voltage of the control signal rises above that of the reference source.

The improvements effected by this form of automatic control circuit is demonstrated in FIGURE 8 of the drawings. In this graphical representation, a curve 94 indicates a variation in control voltage of prior automatic control systems with respect to variation in gap spacing while curve 96 shows the much wider variation in control voltage with respect to gap spacing attained by the control circuit of the invention. Furthermore, the steepest portions of the control voltage curve 96 fall within the desired control region of gap spacing as embraced by the vertical dashed lines 98. Thus, the much greater variation in the control signal of the invention ensures a finer degree of control over the operation of the drive motor 86 and over the resultant positioning of the electrode tool 12 with respect to the workpiece 14 (FIGURE 1).

Referring now more particularly to FIGURE 9 of the drawings, a combination power supply and automatic control circuit arranged in accord with the invention, is illustrated therein. Both the power supply portion of the circuit and the control portion are modified in accordance with additional features of the invention to produce flexibility in the output voltage and the regulatory feature of the former and to attain a finer degree of control in the latter. In FIGURE 9, those components which are substantially similar to related components described above are identified by similar reference characters with primed accents.

In the arrangement of FIGURE 9 then, a bank of three polyphase transformers 50' are utilized whose primary winding 36' are connected through conductors 100 into a Y network, and through conductors 22' to the polyphase input terminals 20'. Their secondary windings 38' are likewise connected in Y relationship through conductor 102 and through conductors 26' to the polyphase rectifier bank 28'. The interconnections of the rectifier elements 42' and 44' and connections to the spark gap capacitors 34' are as set forth previously with respect to similar components of FIGURE 2. The outputs of the rectifier bank 28' and the gap capacitor 34' are applied across the spark gap 104 normally existing between the electrode tool 12' and the workpiece 14'. As noted above, the electrode tool and workpiece are immersed in a dielectric bath 16'–18' resting upon a suitable support 106.

The drive apparatus 58 mentioned briefly above for the electrode tool 12' includes a chuck 108 in which the electrode tool 12' is inserted and tightly held. The chuck 108 is formed in the squared lower end of a screw shaft 110 which is vertically slidable but non-rotatable in a guide sleeve 112 mounted on a suitable support such as an arm 114 overhanging the workpiece 14'. An interiorly threaded bushing or nut 116 is rotatable in a bearing 118 on top of the sleeve 112, and shaft 110 is threaded therethrough. A bevel gear 120 rotatable on the bearing 118 is secured to the nut 116 for driving the latter to cause vertical movement of the shaft 110. The gear 120 is driven by a bevel pinion 122 on the low speed shaft of a speed reduction gear 124 the high speed shaft of which is coupled to the drive motor 86'. The operation of the power supply circuit thus far described is essentially similar to that described above with reference to FIGURES 1 and 2 of the drawings. In the automatic control portion of the circuit, however, an auxiliary secondary winding 56' is wound upon the leakage leg 54' of each of the transformers 50'. The use of auxiliary secondary winding 56' on two or more of the transformers 50' is advantageous, of course, inasmuch as the amplitude of the auxiliary secondary output voltage or signal increases with the addition of each winding 56' and therefore, affords a correspondingly finer degree of control. The output of each auxiliary secondary or control 56' is fed through a pair of conductors 66' to a low pass filter 64'. The outputs of the low pass filters 64' are combined in Y relation by conductor 126 and fed through conductors 128 to a polyphase rectifier bank 130. The construction of the rectifier bank 130 is essentially the same as that of the aforedescribed rectifier bank 28 of FIGURE 2. The rectified output of the rectifier bank 130 is fed through conductors 132 and 134 to the input terminals of the voltage amplifier 70', in series with the standard source 76'. A smoothing condenser 74' is connected across the conductors, 132 and 134 substantially to remove the ripple of the rectified DC.

The voltage amplifier 70' consists essentially of a pair of power transistors 136 and 138, whose emitter-collector circuits are connected respectively to the forward and reverse field windings 82' and 84' of the drive motor 86' in series with DC potential sources 140 and 142.

When the control signal or voltage falls below that of the standard source, electronic current flows from the standard source 76' through conductor 134 in the direction noted by arrow 144 to the transistor base 146, thereby rendering the transistor 136 conductive. This permits the application of potential from the DC field source 140 to the forward field winding 82' of the drive motor 86' to advance the electrode tool 12' toward a workpiece 14'. On the other hand, when the spark gap 104 is too narrow, the control signal voltage rises above that of the standard source 76' so that electronic current flows through conductors 132 and 148 in bucking relation to the source 76', as denoted by arrows 150, to the transistor base 152. This in turn renders the emitter-collector circuit of the transistor 138 conductive to connect the reverse field winding 84' to its potential source 142. As a result, the electrode tool 12' is withdrawn or moved upwardly, as viewed in FIGURE 9 of the drawings away from the workpiece 14' to widen slightly the spark gap 104. As pointed out previously in connection with FIGURE 6 of the drawings, the drive motor 86' is provided in its armature circuit with rectifier element 92' to decrease considerably the time required for each reversal of the drive motor.

In order to permit the spark machining apparatus illustrated in FIGURE 9 to operate satisfactorily over a wide range of operating conditions and with a wide range of conductive materials, circuit means are associated with the power circuit of FIGURE 9 to vary the voltage-current ratio of the power output from the transformer bank. For wide changes in voltage-current ratio the power secondary windings 38' are tapped as denoted by reference character 154, which in cooperation with tap switches 156 vary substantially the output voltage of the transformer bank. Desirably, the tap switches 156 are tied together for simultaneous operation as denoted by dashed line 158. Similarly, the capacitance 34' can be furnished as a switchable bank of capacitors 160 which can be variously coupled across the conductors 32' and 30' by tap switch 162. If desired, tap switch 162 can be tied together with the tap switches 156 of the tapped secondary windings 38' for simultaneously operation therewith, or depending upon the respective values of the capacitors 160 and the tapped windings 38', the switches 156 and 162 can be operated independently. Desirably, the primary windings 36' are also tapped, as denoted by reference character 163, so that by changing both the primary and secondary taps, the transformers 50' can accommodate differing values of capacitors 34'.

For smaller changes in voltage-current ratio, of a more or less vernier nature, a second tapped winding 164 is wound upon the leakage leg 54' of each transformer 50'. The taps 166 of each of the last-mentioned tapped windings are tied respectively together through the branched conductor system denoted generally by the reference character 168 to an external tap switch 170. The ends of the tapped leakage leg windings 164 are similarly tied together through branched conductor 172 to which are joined in electrical parallel, a capacitance 174, and an inductance 176. The inductance 176 and the capacitance 174 are then connected through a selector switch 178 and conductor 180 to the movable switch element 182 of the tap switch 170. It will be understood, of course, that the banks of capacitors and inductors can be used respectively as the capacitance 174 and inductance 176.

With the last-described circuit arrangement, it is apparent that either the capacitance 174 or the inductance 176 can be coupled in electrical series with any one of the interconnected groups of similarly tapped portions of the leakage leg windings 164 by operation of tap switch 170 and the selector switch 178. It has been found that with the capacitance 174 connected in this manner that the voltage-current ratio of the transformer power output is increased with the amount of increase depending upon which of the leakage leg winding taps 166 are being utilized. In a similar manner, a switching in of the inductance 176 operates to decrease the voltage-current ratio of the power output. It will be apparent that, depending upon operating conditions, the numbers of either or both of the secondary taps 154 and the leakage leg winding taps 166 can be increased or decreased. This reference also applies to the number of the spark capacitors 160, mentioned previously.

Figure 10:
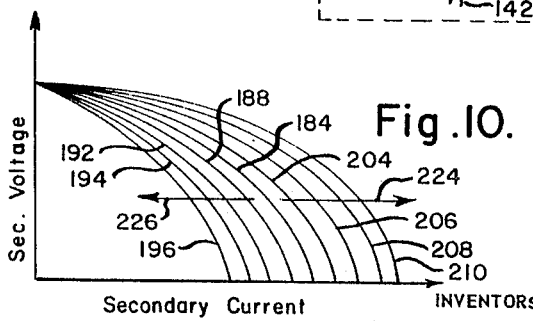
FIGURE 10 is a graphical representation of varying voltage-current ratio associated with the power output of an adjustable form of the power supply arranged in accordance with the invention.

Referring now to the graphical representation of FIGURE 10, this variation in voltage-current ratio is clearly shown by the family of voltage-current curves shown therein. The central curve 184 denotes the normal voltage-current ratio of the secondary power output, i.e., when the switch 178 is in its neutral position 186 to open-circuit the leakage leg windings 164. The adjacent curve 188 denotes the voltage-current ratio which attains when the capacitance 174 is connected to the first taps of the leakage leg windings 164 as denoted by contact 190 of the tap switch 170. In a similar manner, voltage-current curves 192, 194 and 196 correspond to the winding portions connected by taps 198, 200 and 202 of the tap switch 170. On the other hand, the connection of the inductance 176 to the tap switch 170 produces a group of curves 204–210 corresponding respectively to energization of tap switch contacts 190 and 198–202.

Figure 11:
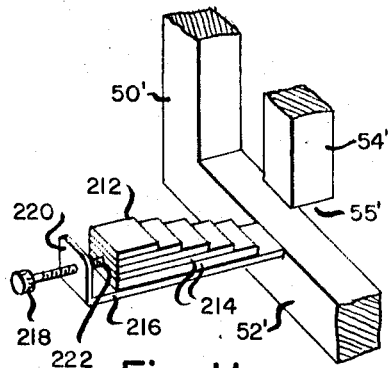
FIGURE 11 is a fragmentary view of another form of control means of the invention for effecting changes in voltage-current ratios.

Referring now to FIGURE 11 of the drawings another form of control means for effecting the more or less vernier changes in voltage-current ratio is shown therein. In its latter form, the control means includes a tapered slug 212 fabricated from a magnetic material and arranged for varying insertion into the air gap 55' of the transformers 50'. The slug 212 desirably is tapered, as by forming from laminae 214 of different lengths, and is slidably mounted on a suitable supporting bracket 216, which in turn is secured to the transformer core structure 52'. For inserting and withdrawing the slug 212 relative to the gap 55' a thumb screw 218 is threaded through an upright end portion 220 of the bracket 216, and the end 222 of the screw in rotatably retained in the adjacent end of the slug 212 in a known manner (not shown). Varying insertion of the slug 212 into the gap 55' induces corresponding variation in the flux-shunting characteristic of the leakage leg 54' and produces changes in voltage-current ratio more or less in accordance with FIGURE 10 of the drawings. Thus, insertion of the slug 212 moves the voltage-current curve to the left as denoted by reference arrow 226, in FIGURE 10, while withdrawal moves the curve to the right as denoted by arrow 224.

From the foregoing it will be apparent that novel and efficient forms of a power supply and automatic control circuit for spark machining or EDM apparatus have been disclosed herein. The descriptive and illustrative materials herein have been employed to exemplify the invention and not in limitation thereof. Accordingly, numerous modifications of the various forms of the invention described herein will occur to those skilled in the art without departing from the spirit and scope with the invention. It is to be understood, of course, that certain features of the invention can be employed without a corresponding use of other features thereof.

We claim:

1. In electric discharge machining apparatus, energy storage means including a capacitor, an electrode tool connected to one terminal thereof and adapted to approach a workpiece connected to the other terminal of the capacitor and forming therewith a discharge circuit for the capacitor, means for mounting the electrode tool for movement toward and away from the workpiece, means for interposing a dielectric fluid between the workpiece and the electrode tool, said capacitor being effective when charged to cause an electric discharge through the dielectric fluid between said electrode tool and workpiece when the gap separating them has been reduced to a predetermined value, a rectifying circuit coupled across said capacitor and forming a charging circuit therefor, transformer means connected through the input of said rectifying circuit, said transformer means having core structure of the leakage leg type, circuit means for connecting said transformer means to a source of fluctuating potential, positioning mechanism mechanically coupled to said electrode tool for moving said tool toward and away from said workpiece, said mechanism including a reversible drive motor therefor, a control winding on the leakage leg of said transformer core structure, circuit means for connecting said last-mentioned winding to a source of constant potential for producing an output control voltage, and additional circuit means sensitive to the polarity of said output voltage for energizing said drive motor to induce corresponding forward and reverse rotations thereof.

2. In electric discharge machining apparatus, energy storage means including a capacitor, an electrode tool connected to one terminal thereof and adapted to approach a workpiece connected to the other terminal of the capacitor and forming therewith a discharge circuit for the capacitor, means for mounting the electrode tool for movement toward and away from the workpiece, means for interposing a dielectric fluid between the workpiece and the electrode tool, said capacitor being effective when charged to cause an electric discharge through the dielectric fluid between said electrode tool and workpiece when the gap separating them has been reduced to a predetermined value, a rectifying circuit coupled across said capacitor and forming a charging circuit therefor, transformer means connected to the input of said rectifying circuit, said transforming means having core structure of the leakage leg type, circuit means for connecting said transformer means to a source of fluctuating potential, positioning mechanism coupled to said electrode tool for moving said tool toward and away from said workpiece, said mechanism including a reversible drive motor therefor, a control winding on the leakage leg of said transformer core structure, said last-mentioned winding being connected in parallel with a low pass filter network to the input of a rectifying circuit, the output of said rectifying circuit being connected in series with a voltage amplifier and in bucking relation to an adjustable source of standard potential, and energizing means for said drive motor sensitive to the polarity of the output of said voltage amplifier for producing corresponding forward and reverse rotations of said drive motor.

3. In electric discharge machining apparatus, energy storage capacitance means, an electrode tool connected to one terminal thereof and adapted to approach a workpiece connected to the other terminal of the capacitance means and forming therewith a discharge circuit for the capacitance means, means for mounting the electrode tool for movement toward and away from the workpiece, means for interposing a dielectric fluid between the workpiece and the electrode tool, said capacitance means being effective when charged to cause an electric discharge through the dielectric fluid between said electrode tool and workpiece when the gap separating them has been reduced to a predetermined value, a first rectifying circuit coupled across said capacitance means and forming a charging circuit therefor, transformer means connected to the input of said first rectifying circuit, said transforming means having core structure of the leakage leg type, primary and secondary winding means mounted thereon in spaced relation to said leakage leg, circuit means for connecting said primary transformer winding means to a course of fluctuating potential, positioning mechanism coupled to said electrode tool for moving said tool toward and away from said workpiece, said mechanism including a reversible drive motor therefor, a control winding on the leakage leg of said transformer core structure, said last-mentioned winding being connected in parallel with a low pass filter network to the input of a second rectifying circuit, the output of said second rectifying circuit being connected in series with a voltage amplifier and in bucking relation to a source of adjustable standard potential, energizing means for said drive motor sensitive to the polarity of the output of said voltage amplifier for producing corresponding forward and reverse rotations of said motor, said capacitance means including a bank of electrically paralleled capacitors connected respectively in series with contacts of capacitor bank switching means across the output terminals of said first rectifying circuit, and said secondary transformer winding means including at least one tapped secondary winding connected in series with a tap switch to the input of said first rectifying circuit.

4. In electric discharge machining apparatus, energy storage means including a capacitor, an electrode tool connected to one terminal thereof and adapted to approach a workpiece connected to the other terminal of the capacitor and forming therewith a discharge circuit for the capacitor, means for mounting the electrode tool for movement toward and away from the workpiece, means for interposing a dielectric fluid between the workpiece and the electrode tool, said capacitor being effective when charged to cause an electric discharge through the dielectric fluid between said electrode tool and workpiece when the gap separating them has been reduced to a predetermined value, a first polyphasal rectifying circuit coupled across said capacitor and forming a charging circuit therefor, transformer means connected to the input of said rectifying circuit, said transformer means including a plurality of transformers each having a core structure with a leakage leg and primary and secondary winding legs respectively, polyphasal circuit means for connecting said primary windings to a source of polyphasal potential and for connecting said secondary windings to the input of said first polyphasal rectifying circuit, positioning mechanism for moving said electrode tool toward and away from said workpiece, said mechanism including a reversible drive motor therefor, a control winding on the leakage leg of each of said transformer core structures, said control windings being connected in polyphasal relation to the input terminals of a second polyphasal rectifying circuit, the output of said second rectifying circuit being connected in series with a standard constant potential source to a voltage amplifier to produce an output control voltage, drive motor field energizing means sensitive to the polarity of said output control voltage for producing corresponding forward and reverse rotations in said drive motor.

5. In electric discharge machining apparatus, energy storage means including a capacitor, an electrode tool connected to one terminal thereof and adapted to approach a workpiece connected to the other terminal of the capacitor and forming therewith a discharge circuit for the capacitor, means for mounting the electrode tool for movement toward and away from the workpiece, means for interposing a dielectric fluid between the workpiece and the electrode tool, said capacitor being effective when charged to cause an electric discharge through the dielectric fluid between said electrode tool and workpiece when the gap separating them has been reduced to a predetermined value, a first polyphasal rectifying circuit coupled across said capacitor and forming a charging circuit therefor, transformer means connected to the input of said rectifying circuit, said transformer means including a plurality of transformers each having a core structure with a leakage leg and primary and secondary winding legs spaced therefrom, polyphasal circuit means for connecting said primary windings to a source of polyphasal potential and for connecting said secondary windings to the input of said rectifying circuit, positioning mechanism for moving said electrode tool toward and away from said workpiece, a reversible drive motor therefor, a control winding on the leakage leg of each of said transformer core structures, said control windings being connected in polyphasal relation to the input of a second polyphasal rectifying circuit, the output of said second rectifying circuit being connected in series bucking relation with a standard constant potential source to a voltage amplifier to produce an output control voltage, drive motor field energizing means sensitive to the polarity of said output voltage for producing corresponding forward and reverse rotations of said drive motor, a tapped regulatory winding on the leakage leg of each of said core structures, said tapped windings being connected in electrical parallel to tap switch means, and selector switch means for connecting one of capacitance means and inductance means in electrical series with said tapped windings and said tap switch means.

6. In electric discharge machining apparatus, energy storage means including a capacitor, an electrode tool connected to one terminal thereof, a juxtaposed workpiece connected to the other terminal of the capacitor and forming therewith a discharge circuit for the capacitor, means for mounting the electrode tool and said workpiece for relative movement to vary a discharge gap therebetween, means for interposing a dielectric fluid between the workpiece and the electrode tool, said capacitor being effective when charged to cause an electric discharge through the dielectric fluid between said electrode tool and workpiece when the gap separating them has been reduced to a predetermined value, a rectifying circuit coupled across said capacitor and forming a charging circuit therefor, transformer means connected through the input of said rectifying circuit, said transformer means having core structure of the leakage leg type, circuit means for connecting said transformer means to a source of fluctuating potential, reversible electro-mechanical positioning mechanism coupled to one of said tool and said workpiece for varying the gap therebetween, control winding means on the leakage leg of said transformer core structure, circuit means coupled to said control winding and to said positioning mechanism for energizing said mechanism in forward and reverse directions in response to voltage changes in said control winding.

7. The combination according to claim 6 wherein said transformer means include a plurality of polyphase-connected transformers of the leakage leg type, said control winding means including a control winding on the leakage leg of at least one of said transformers.

8. The combination according to claim 7 wherein additional circuit means are provided including additional winding means on said one leakage leg for varying the voltage-current ratio of said transformer means.

References Cited
UNITED STATES PATENTS

| | | | |
|---|---|---|---|
| 1,854,490 | 4/1932 | Sola | 336—165 |
| 2,432,343 | 12/1947 | Short | 336—165 X |
| 2,444,715 | 7/1948 | Walker | 336—165 X |
| 2,634,392 | 4/1953 | Pohm | 323—89.8 X |
| 2,886,693 | 5/1959 | Harris et al. | |
| 2,944,208 | 7/1960 | Quimby | 323—48 |
| 3,211,882 | 10/1965 | Webb et al. | |

ANTHONY BARTIS, Primary Examiner

R. F. STAUBLY, Assistant Examiner

U.S. Cl. X.R.

323—48, 89; 336—165, 170, 178